(12) United States Patent
Sato et al.

(10) Patent No.: US 6,706,230 B2
(45) Date of Patent: *Mar. 16, 2004

(54) AUXILIARY JIG

(75) Inventors: Keiichi Sato, Saitama-ken (JP); Yuki Kasahara, Saitama-ken (JP); Junichi Kondo, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 09/944,587

(22) Filed: Sep. 4, 2001

(65) Prior Publication Data

US 2002/0027187 A1 Mar. 7, 2002

(30) Foreign Application Priority Data

Sep. 5, 2000 (JP) .......................... 2000-269205

(51) Int. Cl.$^7$ .............................................. B29O 33/00
(52) U.S. Cl. ....................... 264/257; 264/313; 425/111; 425/DIG. 44; 249/163; 249/187.1
(58) Field of Search .................................. 264/241, 248, 264/257, 313, 319; 156/381, 383, 297, 391, 70, 500; 269/40; 249/160, 163, 187.1; 425/111, 403, DIG. 49

(56) References Cited

U.S. PATENT DOCUMENTS

| | | | | |
|---|---|---|---|---|
| 6,245,275 | B1 * | 6/2001 | Holsinger | 264/257 |
| 6,391,246 | B2 * | 5/2002 | Shiraishi et al. | 264/510 |
| 6,478,922 | B1 * | 11/2002 | Rosevear et al. | 156/297 |
| 6,508,909 | B1 * | 1/2003 | Cerezo Pancorbo et al. | 156/306.6 |
| 6,523,246 | B1 * | 2/2003 | Matsui et al. | 29/559 |

* cited by examiner

Primary Examiner—Robert Davis
Assistant Examiner—Joseph S. Del Sole
(74) Attorney, Agent, or Firm—Sughrue Mion, PLLC

(57) ABSTRACT

An auxiliary jig used with a couple of jigs for forming a structure made of a fiber-reinforced composite by heating under a pressure. The auxiliary jig is provided between the jigs while heating the structure under a pressure to prevent the jigs from falling down and to restrain a resin contained in the fiber-reinforced composite from flowing out from an interspace between the jigs.

6 Claims, 5 Drawing Sheets

AUXILIARY JIG

BACKGROUND OF THE INVENTION

The present invention relates to an auxiliary jig used for forming a structure made of a fiber-reinforced composite.

Stiffened panels made of a fiber-reinforced composite (prepreg) are light in weight and high in strength to have been widely used for automobiles, ships, aircrafts, etc. The stiffened panels generally comprise a skin strengthened by a plurality of stiffeners (stringers and frames), the skin and the stiffeners being integrally formed. FIG. 1 is a partial perspective view showing an example of the stiffened panel. A stiffened panel 1 shown in FIG. 1 comprises a skin 2 and a stiffener 3 integrally formed therewith. As shown in FIGS. 4(a) and 4(b), the stiffened panel may be produced by a method comprising the steps of: placing a skin member 2 and a preformed stiffener member 31 each made of a fiber-reinforced composite on a forming tool 4; disposing a couple of jigs 5a and 5b on the preformed stiffener member 31; and integrally forming the skin member 2 and the preformed stiffener member 31 by heating under a pressure using a pressure bag, etc.

The above-mentioned method is disadvantageous in that a resin contained in the fiber-reinforced composite often flows out from an interspace between the jigs 5a and 5b in the direction of arrow A shown in FIG. 4(b) while heating under a pressure. If a large quantity of the resin flows out from the interspace, the resultant fiber-reinforced composite structure is poor in such a quality as strength, rigidity, etc. Thus, as shown in FIG. 5, the resin has been conventionally restrained from flowing out by sticking a temperature resistant tape 7 to the preformed stiffener member 31 and the jigs 5a and 5b disposed thereon. However, the process of sticking the temperature resistant tape is complicated and troublesome, thereby requiring much effort.

Further, in the above-mentioned method, the jigs 5a and 5b often fall down while heating under a pressure as shown in FIG. 6. In this case, the resultant fiber-reinforced composite structure is poor in form accuracy with unevenness stiffener thickness. The fiber-reinforced composite structure can be formed with high form accuracy by using a large-scale jig together with the jigs 5a and 5b, however, this results in increased costs and poor workability.

OBJECT AND SUMMARY OF THE INVENTION

An object of the present invention is to provide an auxiliary jig used for forming a structure made of a fiber-reinforced composite with high form accuracy without reduction of strength and rigidity.

As a result of intensive research in view of the above object, the inventors have found that a structure made of a fiber-reinforced composite having desired strength and rigidity can be formed with high form accuracy by using a particular auxiliary jig together with a couple of jigs while forming. The present invention has been accomplished by the finding.

Thus, an auxiliary jig of the present invention is used with a couple of jigs for forming a structure made of a fiber-reinforced composite by heating under a pressure, the auxiliary jig being provided between the couple of jigs to prevent the jigs from falling down and to restrain a resin contained in the fiber-reinforced composite from flowing out from an interspace between the jigs.

The auxiliary jig of the present invention preferably comprises a rigid portion and an elastic portion. The rigid portion is preferably made of a stainless steel, aluminum, graphite or CFRP, and the elastic portion is particularly preferably made of a silicone rubber.

The auxiliary jig of the present invention is particularly preferably used for forming a stiffened panel. Thus, a stiffened panel having uniform, excellent qualities can be produced with high form accuracy by a method comprising the steps of: placing an skin member and a preformed stiffener member each made of a fiber-reinforced composite on a forming tool; disposing the couple of jigs on the preformed stiffener member; providing the auxiliary jig of the present invention between the jigs; and integrally forming the skin member and the preformed stiffener member by heating under a pressure.

DETAILED DESCRIPTION OF THE PREFERRED EMBODIMENTS

An auxiliary jig of the present invention is used with a couple of jigs when a structure made of a fiber-reinforced composite is formed by heating under a pressure. The auxiliary jig is provided between the jigs while heating the fiber-reinforced composite structure under a pressure to prevent the jigs from falling down and to restrain a resin contained in the fiber-reinforced composite from flowing out from an interspace between the jigs.

Figure 1:
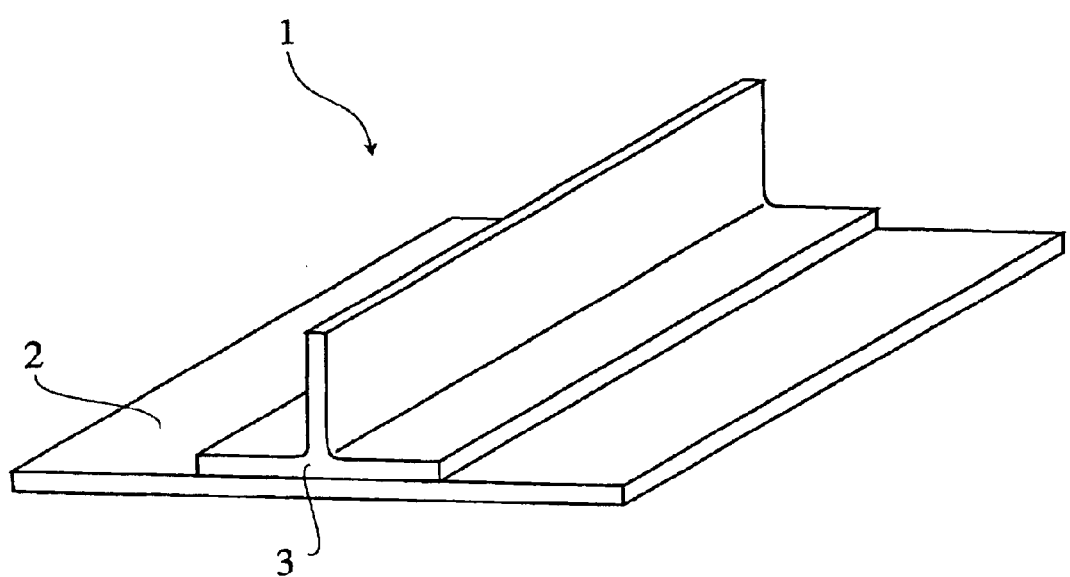
FIG. 1 is a partial perspective view showing an example of a stiffened panel.

The auxiliary jig of the present invention may be used for forming various fiber-reinforced composite structures, and it is particularly preferably used for forming a stiffened panel. Formation of a stiffened panel 1 shown in FIG. 1 using the auxiliary jig of the present invention will be explained in detail below without intention of restricting the scope of the present invention, with reference to drawings.

Figure 2:
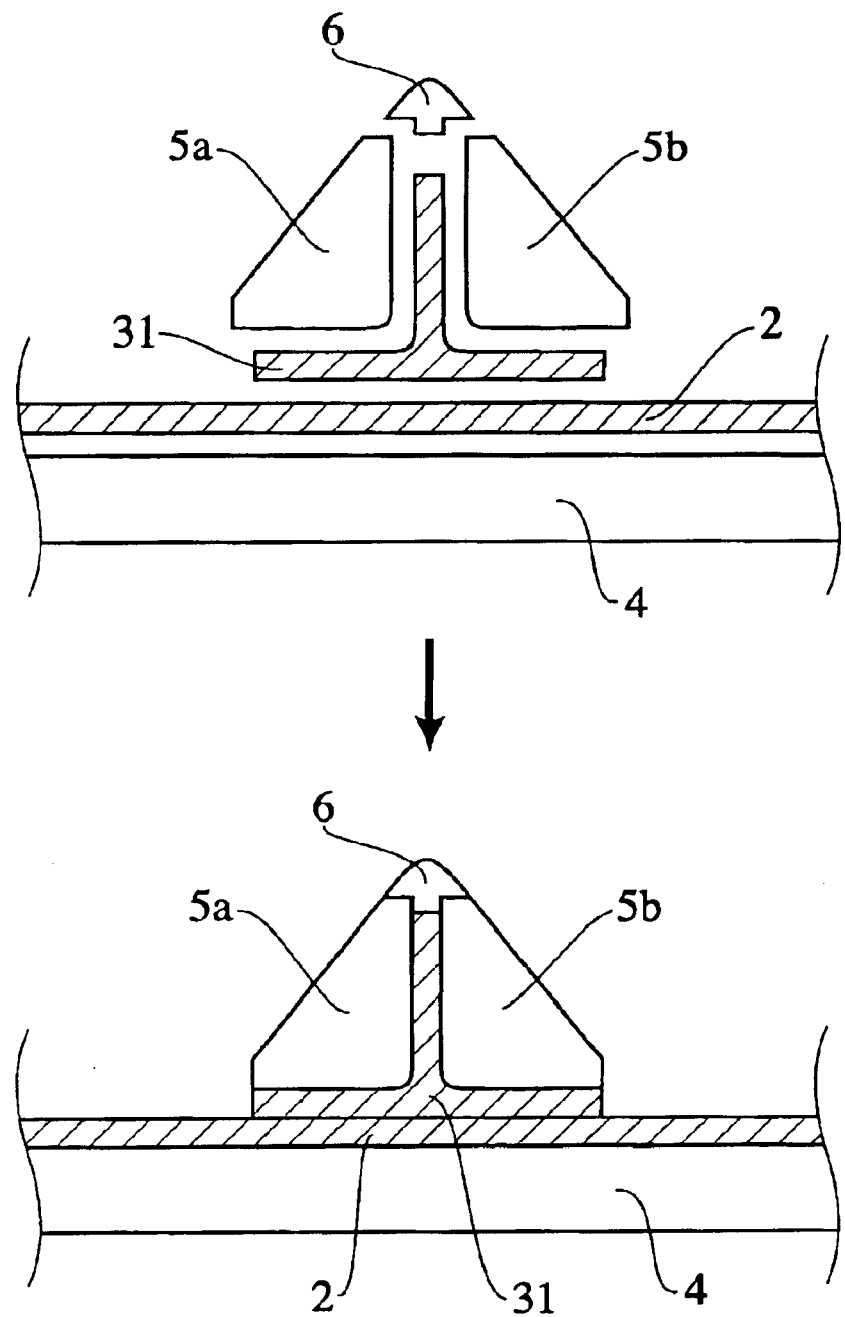
FIG. 2 is a partial sectional view showing formation of a stiffened panel, where an auxiliary jig of the present invention is used.

As shown in FIG. 2, the stiffened panel is produced by a method comprising the steps of: placing a skin member 2 and a preformed stiffener member 31 each made of a fiber-reinforced composite on a forming tool 4; disposing the jigs 5a and 5b on the preformed stiffener member 31; providing the auxiliary jig 6 according to the present invention between the jigs 5a and 5b; and integrally forming the skin member 2 and the preformed stiffener member 31 by heating under a pressure.

As shown in FIG. 2, side surfaces of the preformed stiffener member 31 are exposed to the outside. It is preferred that a sheet made of a silicone, etc. is disposed on each of the side surfaces to prevent a resin contained in the fiber-reinforced composite from flowing out from the side surfaces.

The couple of jigs used together with the auxiliary jig of the present invention may be made of a known material such as a steel, aluminum, etc. Further, the forming tool may be made of FRP, a steel, aluminum, etc.

Figure 3A:
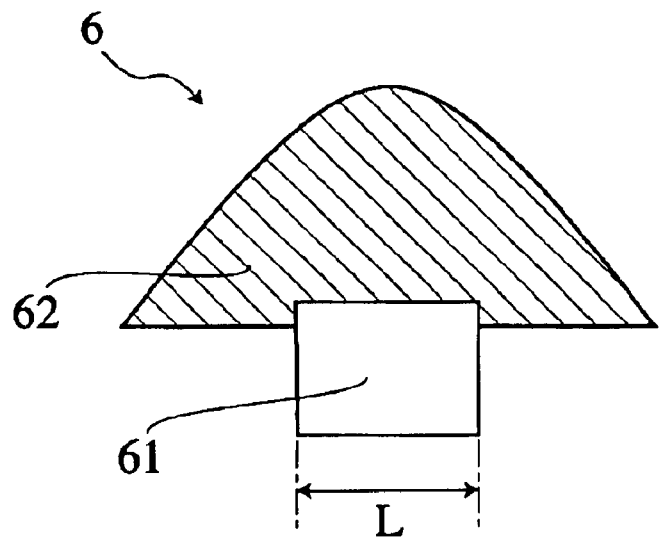
FIGS. 3(a) and 3(b) are a sectional view showing an example of an auxiliary jig of the present invention, respectively.
Figure 3B:
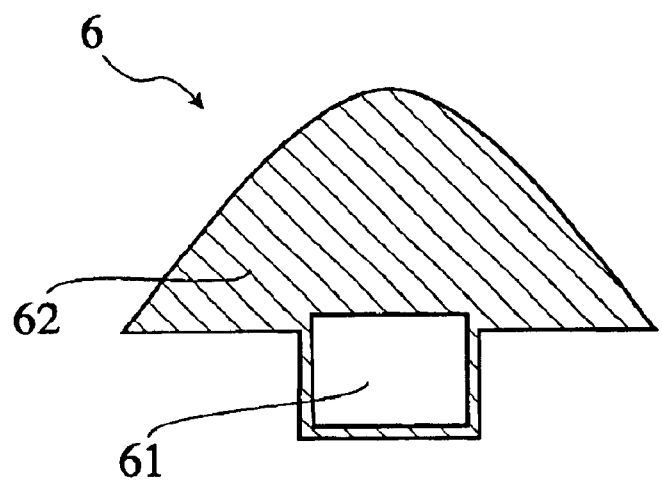
Figure 4A:
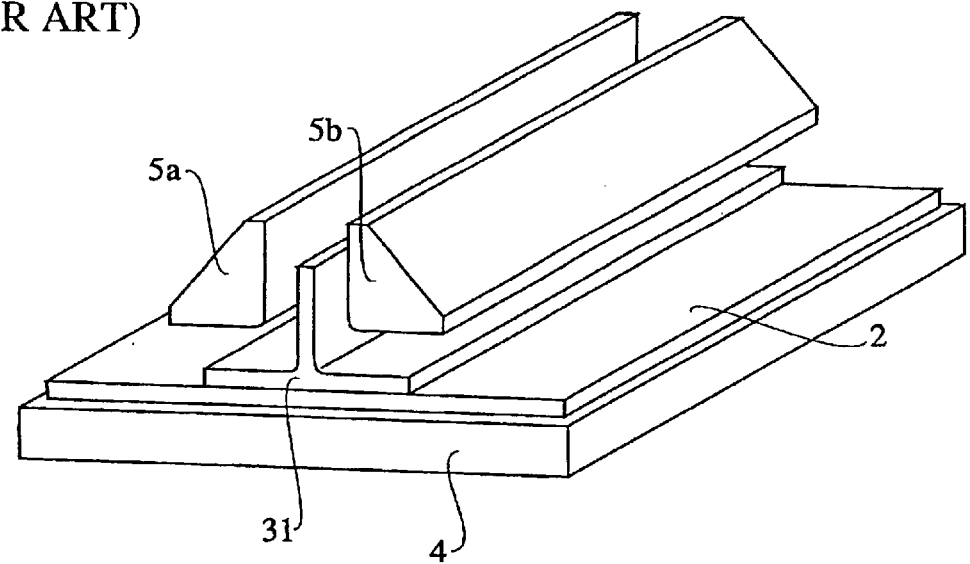
FIG. 4(a) is a partial perspective view showing formation of a stiffened panel by a conventional method.
Figure 4B:
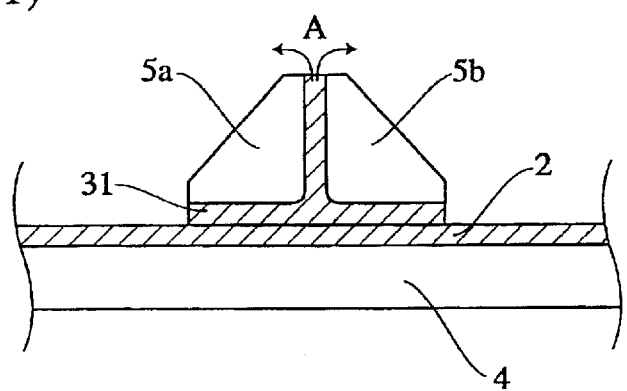
FIG. 4(b) is a partial sectional view showing formation of a stiffened panel of FIG. 4(a) by a conventional method.
Figure 5:
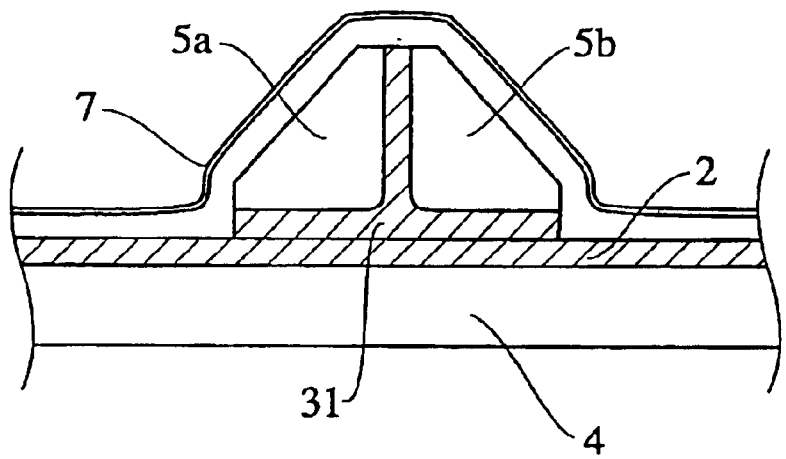
FIG. 5 is a partial sectional view showing formation of a stiffened panel, where a temperature resistant tape is stuck to a preformed stiffener member and jigs by a conventional method.
Figure 6:
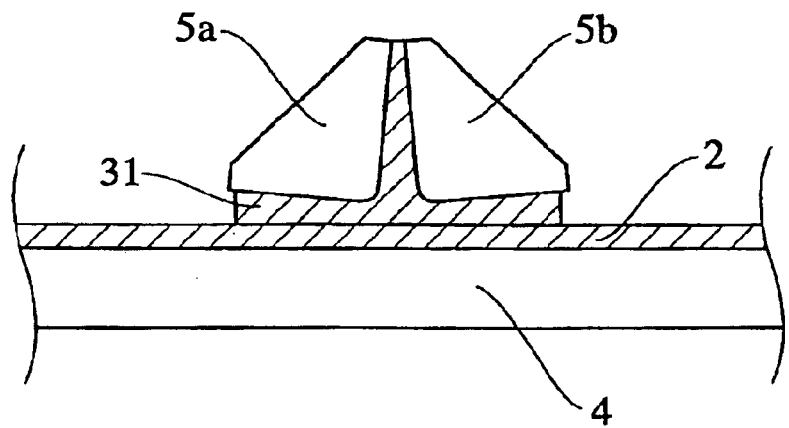
FIG. 6 is a partial sectional view showing formation of a stiffened panel, where jigs fall down while forming by a conventional method.

The auxiliary jig of the present invention preferably comprises a rigid portion and an elastic portion. For example, the auxiliary jig 6 shown in FIG. 3(a) comprises a rigid portion 61 and an elastic portion 62. As shown in FIG. 3(b), the rigid portion 61 may be covered with the elastic portion 62. It is preferable that the rigid portion 61 and the elastic portion 62 are integrally formed by liquid injection molding.

The rigid portion 61 acts to prevent the jigs 5a and 5b from falling down, thereby controlling thickness of the preformed stiffener member 31. Although shape of the rigid portion is not particularly limited, width L of the rigid portion 61 shown in FIG. 3(a) is preferably equal to the desired width of the fiber-reinforced composite structure. The rigid portion is preferably made of a material that is excellent in dimensional stability, strength and rigidity, and low in thermal expansivity. Examples of such a material include: metals such as stainless steels and aluminum; graphite; CFRP; etc.

The elastic portion 62 acts to restrain the resin contained in the fiber-reinforced composite from flowing out from the interspace between the jigs 5a and 5b. The elastic portion is preferably made of an elastomer high in flexibility and thermal resistance, more preferably made of a silicone rubber or a teflon rubber. Of these, the silicone rubber is particularly preferable from the viewpoints of releasability and liquid injection moldability. If the entire auxiliary jig of the present invention is made of a rigid material such as aluminum, etc., there is a case where the resin contained in the fiber-reinforced composite flows out from interspaces between the jigs and the auxiliary jig. The elastic portion is pressed to the jigs by the forming pressure, whereby the interspaces between the jigs and the auxiliary jig are sufficiently sealed to more effectively restrain the resin from flowing out. The shape of the elastic portion is not particularly limited if only it can be stuck to the jigs.

The auxiliary jig of the present invention may be used for forming a structure made of a fiber-reinforced composite composed of such a reinforcing fiber as a carbon fiber, a glass fiber, an aramid fiber, etc. impregnated with a thermosetting resin or a thermoplastic resin. Examples of the thermosetting resin include epoxy resins, bismaleimide resins, phenol resins, etc., and examples of the thermoplastic resin include PEEK, nylon 6, nylon 66, polyethylene terephthalate, etc.

The auxiliary jig of the present invention may be used in the case where the fiber-reinforced composite structure is formed by long period of heating at a high temperature under a high pressure. For example, the auxiliary jig of the present invention can sufficiently prevent the fall down of the jigs and the flow out of the resin when the structure is formed by heating at 120 to 180° C. under a pressure of 5 to 20 kg/cm$^2$ for 1 to 2 hour. The structure may be heated under a pressure by an autoclave, etc. The auxiliary jig of the present invention may be used repeatedly.

Though the auxiliary jig of the present invention has been explained above with reference to the attached drawings, the present invention is not restricted thereto and any variations and modifications are possible unless the scope and spirit of the present invention are changed.

As described in detail above, an auxiliary jig of the present invention used together with a couple of jigs acts to prevent the jigs from falling down and to restrain a resin from flowing out from an interspace between the jigs, whereby a fiber-reinforced composite structure is formed with excellent qualities and high form accuracy. The auxiliary jig of the present invention is particularly preferably used for forming a stiffened panel.

What is claimed is:

1. An auxiliary jig used with a couple of jigs for forming a structure made of a fiber-reinforced composite by heating under a pressure, wherein said auxiliary jig is provided between said jigs, and comprises means for preventing said jigs from falling down and for restraining a resin contained in said fiber-reinforced composite from flowing out from an interspace between said jigs, wherein said auxiliary jig comprises a rigid portion and an elastic portion.

2. The auxiliary jig according to claim 1, wherein said rigid portion is made of a stainless steel, aluminum, graphite or CFRP.

3. The auxiliary jig according to claim 1, wherein said elastic portion is made of a silicone rubber.

4. The auxiliary jig according to claim 1, wherein said auxiliary jig is used for producing a stiffened panel by a method comprising the steps of: placing a skin member and a preformed stiffener member, each made of a fiber-reinforced composite, on a forming tool; disposing said couple of jigs on said preformed stiffener member; providing said auxiliary jig between said jigs; and integrally forming said skin member and said preformed stiffener member by heating under a pressure.

5. A method of producing a stiffened panel of a fiber-reinforced composite, using a couple of jigs, said method comprising the steps of:

placing a skin member and a preformed stiffener member, each made of a fiber-reinforced composite, on a forming tool;

disposing said couple of jigs on said preformed stiffener member;

providing an auxiliary jig having a rigid portion and an elastic portion;

preventing said couple of jigs from falling down, and restraining a resin, contained in said fiber-reinforced composite, from flowing out, by placing said auxiliary jig between said couple of jigs;

and integrally forming said skin member and said preformed stiffener member by heating under a pressure.

6. An apparatus for producing a stiffened panel of a fiber-reinforced composite by heating under pressure, said apparatus comprising:

a forming tool;

a couple of jigs, disposed on said forming tool, for receiving a skin member and a preformed stiffener member, each made of a fiber-reinforced composite containing a resin; and an auxiliary jig disposed between said couple of jigs, said auxiliary jig comprising means for preventing falling down of said couple of jigs, and for restraining the resin from flowing out, said means comprising a rigid portion of said auxiliary jig and an elastic portion of said auxiliary jig.

* * * * *